United States Patent
Fuchs et al.

(10) Patent No.: US 10,135,473 B2
(45) Date of Patent: Nov. 20, 2018

(54) BIT RATE COMPRESSION FOR SIGNAL TRANSMISSION

(71) Applicant: NOKIA SOLUTIONS AND NETWORKS OY, Espoo (FI)

(72) Inventors: Armin Fuchs, Deggingen (DE); Bjoern Jelonnek, Ulm (DE); Michael Weber, Neu-Ulm (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/415,461

(22) Filed: Jan. 25, 2017

(65) Prior Publication Data
US 2018/0212632 A1 Jul. 26, 2018

(51) Int. Cl.
*H04B 1/04* (2006.01)
*H04L 29/06* (2006.01)

(52) U.S. Cl.
CPC ......... *H04B 1/0483* (2013.01); *H04B 1/0475* (2013.01); *H04L 69/04* (2013.01); *H04B 2001/0425* (2013.01)

(58) Field of Classification Search
CPC . H03M 7/24; H03M 7/00; H03M 7/30; H04L 27/3405
See application file for complete search history.

(56) References Cited

U.S. PATENT DOCUMENTS

| | | | | |
|---|---|---|---|---|
| 2011/0099295 | A1* | 4/2011 | Wegener | H03M 7/24 709/247 |
| 2013/0321182 | A1* | 12/2013 | Cheng | H03M 7/30 341/87 |
| 2015/0032002 | A1* | 1/2015 | Rothberg | G01S 7/52084 600/440 |

* cited by examiner

*Primary Examiner* — David S Huang
(74) *Attorney, Agent, or Firm* — Squire Patton Boggs (US) LLP (57) ABSTRACT

Various antennas may benefit from improved signaling. For example, it may be helpful for a signal in a high occupied bandwidth environment to be compressed using a block floating point format, which can also help to reduce power consumption. A method may include separating an incoming signal at a digital front end or a converter into two alternating signals comprising a coarse signal and a fine signal. The method may also include transmitting the coarse signal and the fine signal from the digital front end to the converter or from the converter to the digital front end. The coarse signal and the fine signal may be combined to generate an approximation of the incoming signal.

18 Claims, 8 Drawing Sheets

| 401 | | | 404 |
|---|---|---|---|
| sample 1+2 | $m_o$ bit + $m_e$ bit inphase | general purpose | sample 1+2 | $m_o$ bit + $m_e$ bit quadrature | 1 bit exponent |
| sample 3+4 | $m_o$ bit + $m_e$ bit inphase | general purpose | sample 3+4 | $m_o$ bit + $m_e$ bit quadrature | 1 bit exponent |
| sample 5+6 | $m_o$ bit + $m_e$ bit inphase | general purpose | sample 5+6 | $m_o$ bit + $m_e$ bit quadrature | 1 bit exponent |
| sample 7+8 | $m_o$ bit + $m_e$ bit inphase | general purpose | sample 7+8 | $m_o$ bit + $m_e$ bit quadrature | 1 bit exponent |

Figure 4

| 501 | | 502 | | 503 | 504 |
|---|---|---|---|---|---|
| sample 1 | 6 bit inphase + 6 bit quadrature | sample 2 | 9 bit inphase + 9 bit quadrature | 1 bit exponent | 1 bit exponent |
| sample 3 | 6 bit inphase + 6 bit quadrature | sample 4 | 9 bit inphase + 9 bit quadrature | 1 bit exponent | 1 bit exponent |
| sample 5 | 6 bit inphase + 6 bit quadrature | sample 6 | 9 bit inphase + 9 bit quadrature | 1 bit exponent | 1 bit exponent |
| sample 7 | 6 bit inphase + 6 bit quadrature | sample 8 | 9 bit inphase + 9 bit quadrature | 1 bit exponent | 1 bit exponent |

BIT RATE COMPRESSION FOR SIGNAL TRANSMISSION

BACKGROUND

Field

Various antennas may benefit from improved signaling. For example, it may be helpful for a signal in a high occupied bandwidth environment to be compressed using a block floating point format, which can also help to reduce power consumption.

Description of the Related Art

Third Generation Partnership Project (3GPP) 5th generation (5G) technology utilizes high occupied bandwidth (oBW), a high modulation scheme, for example a 64 quadrature amplitude modulation (QAM), and a high number of antenna elements, generally greater than 64, to achieve maximum data throughput for the user. The use of high oBW in combination with the use of different carrier configurations, can help to increase the flexibility of the network.

Digital pre-distortion (DPD) is used to reduce distortion which is caused by running power amplifiers in their non-linear regions. For DPD in a high oBW environment, an oversampling factor greater than 2.5 is used in order to reduce in-band as well as out of band spurious components. Without any optimization, this high oversampling factor can result in a high data bit rate at an interface between a digital front end device of a transmitter and a converter, which causes increased power consumption in the network.

SUMMARY

A method may include separating an incoming signal at a digital front end or a converter into two alternating signals comprising a coarse signal and a fine signal. The method may also include transmitting the coarse signal and the fine signal from the digital front end to the converter or from the converter to the digital front end. The coarse signal and the fine signal may be combined to generate an approximation of the incoming signal.

According to certain embodiments, an apparatus may include at least one memory including computer program code, and at least one processor. The at least one memory and the computer program code may be configured, with the at least one processor, at least to separate an incoming signal at a digital front end or a converter into two alternating signals comprising a coarse signal and a fine signal. The at least one memory and the computer program code may also be configured, with the at least one processor, at least to transmit the coarse signal and the fine signal from the digital front end to the converter or from the converter to the digital front end. The coarse signal and the fine signal may be combined to generate an approximation of the incoming signal.

An apparatus, in certain embodiments, may include means for separating an incoming signal at a digital front end or a converter into two alternating signals comprising a coarse signal and a fine signal. The apparatus may also include means for transmitting the coarse signal and the fine signal from the digital front end to the converter or from the converter to the digital front end. The coarse signal and the fine signal may be combined to generate an approximation of the incoming signal.

According to certain embodiments, a non-transitory computer-readable medium encoding instructions that, when executed in hardware, perform a process. The process may include separating an incoming signal at a digital front end or a converter into two alternating signals comprising a coarse signal and a fine signal. The process may also include transmitting the coarse signal and the fine signal from the digital front end to the converter or from the converter to the digital front end. The coarse signal and the fine signal may be combined to generate an approximation of the incoming signal.

According to certain embodiments, a computer program product encoding instructions for performing a process according to a method including separating an incoming signal at a digital front end or a converter into two alternating signals comprising a coarse signal and a fine signal. The method may also include transmitting the coarse signal and the fine signal from the digital front end to the converter or from the converter to the digital front end. The coarse signal and the fine signal mat be combined to generate an approximation of the incoming signal.

BRIEF DESCRIPTION OF THE DRAWINGS

For proper understanding of the invention, reference should be made to the accompanying drawings, wherein.

DETAILED DESCRIPTION

Certain embodiments utilize a block floating point format to allow for a dynamic range of signal transmissions from the digital front end of a transmitter, which reduces the bit rate and maintains the signal-to-noise ratio of a signal. In particular, certain embodiment may alternate samples between a coarse signal and a fine signal, having different lengths, which can allow for a reduction of in-band noise. The signal may be transmitted, in some embodiments, over a joint electron device engineering council standard (JESD) interface. The JESD interface, for example, may be a JESD 204B or a JESD 204C. JESD 204B and JESD 204C are hereby incorporated by reference in their entirety.

The block floating point format may be used to compress signal transmissions. The compression may allow for a reduced bit rate for the signal transmission from the digital front end to a converter. In certain embodiments, the reduced bit rate may be utilized to include other additional controls, such as a control of general purpose pins or control of various registers in a data converter, which can simplify the board layout, as well as reduce the power consumption of the interface.

The use of a block floating point format described below may in some embodiments help to reduce the bit rate by up to 50%. For example, certain embodiments may allow for the transmission of a 9-bit sample with 64B/66B coding, which may be a reduction of the bit rate of 50% compared to the 16-bit sample with 8B/10B coding. Further details relating to 64B/66B coding can be found in IEEE 802.3, which is hereby incorporated by reference in its entirety.

In certain embodiments, the compression of data using the block floating point format may be conducted at a digital front end device itself, while the decompression of the signal may be conducted at the converter. In other embodiments, the compression of data may occur at the converter, and the decompression of the signal may be conducted at the DFE. The converter may be any type of digital-to-analog converter or analog-to-digital converter. In addition, the data may be embedded with personal information that can allow for the control of general-purpose registers and/or general purpose input or output pins, as shown in FIGS. 1 and 2.

Figure 1:
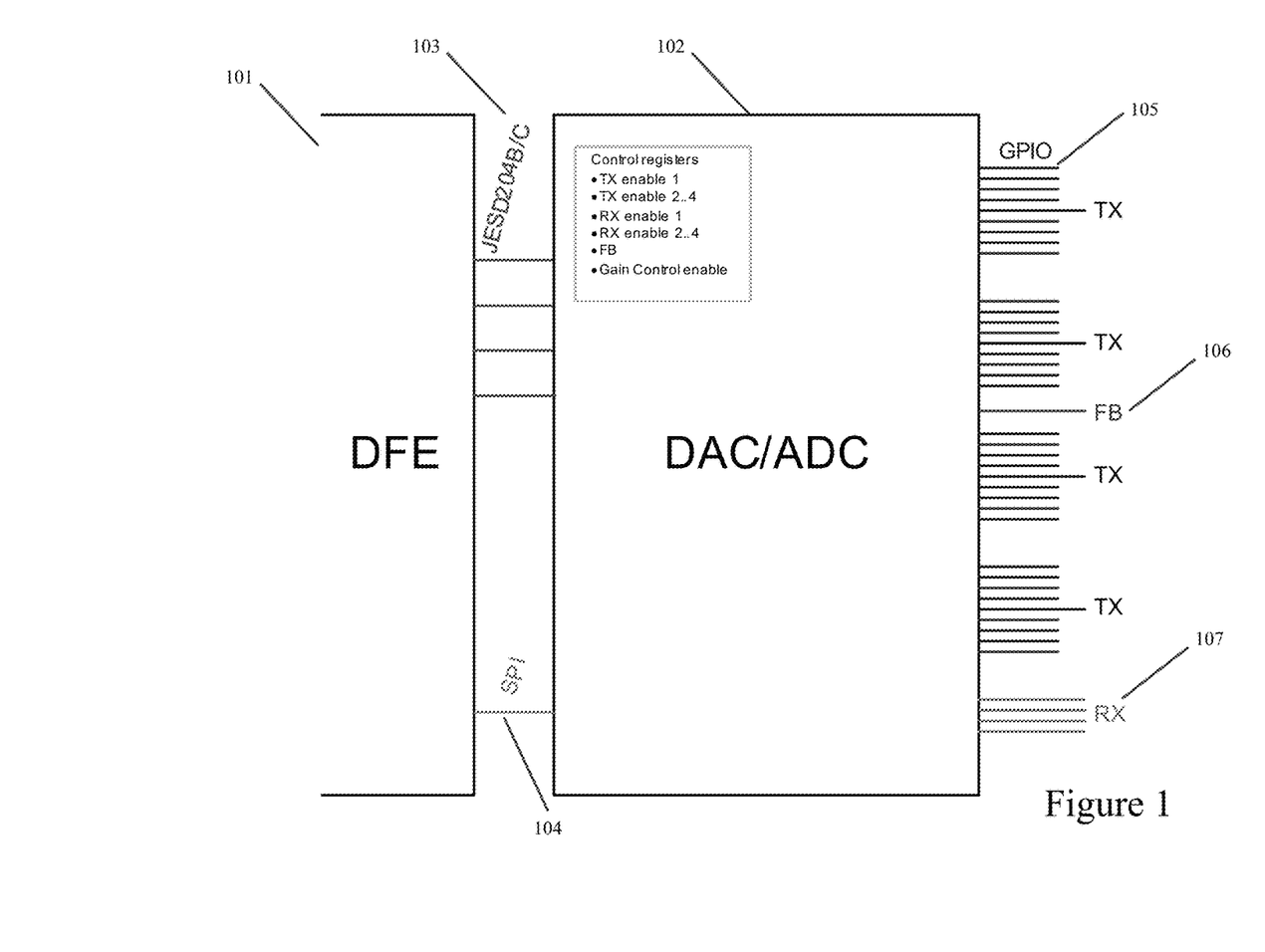
FIG. 1 illustrates a digital front end and different transceiver modes according to certain embodiments.
Figure 2:
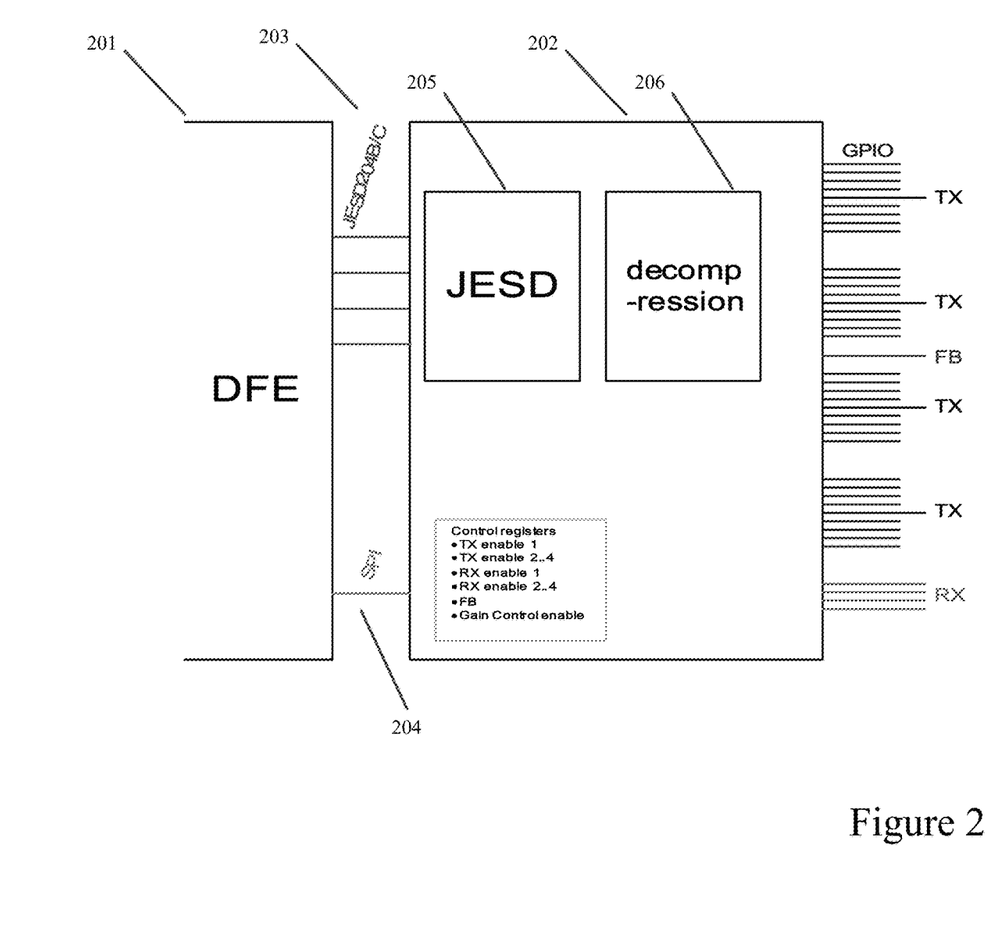
FIG. 2 illustrates a digital front end and different transceiver modes according to certain embodiments.

FIG. 1 illustrates an example of a digital front end according to certain embodiments. In particular, FIG. 1 illustrates digital front end (DFE) 101 and a converter 102. DFE 101 and converter 102 may both be part of the same apparatus, or may be located at two different apparatuses. The converter may be a digital-to-analog converter or an analog-to-digital converter. A signal may be transmitted from DFE 101 to converter 102, in certain embodiments, through a digital interface, such as JESD 204B/C, 103 and/or additional control information through may be transmitted by the digital interface or an additional interface, for example a serial peripheral interface (SPI) 104. SPI 104 may be an interface used for short distance communication. In other embodiments, any other interface may be used to transmit a signal from DFE 101 to converter 102. In addition, as discussed above, in certain embodiments, the signal may be transmitted from converter 102 to DFE 101.

Figure 3:
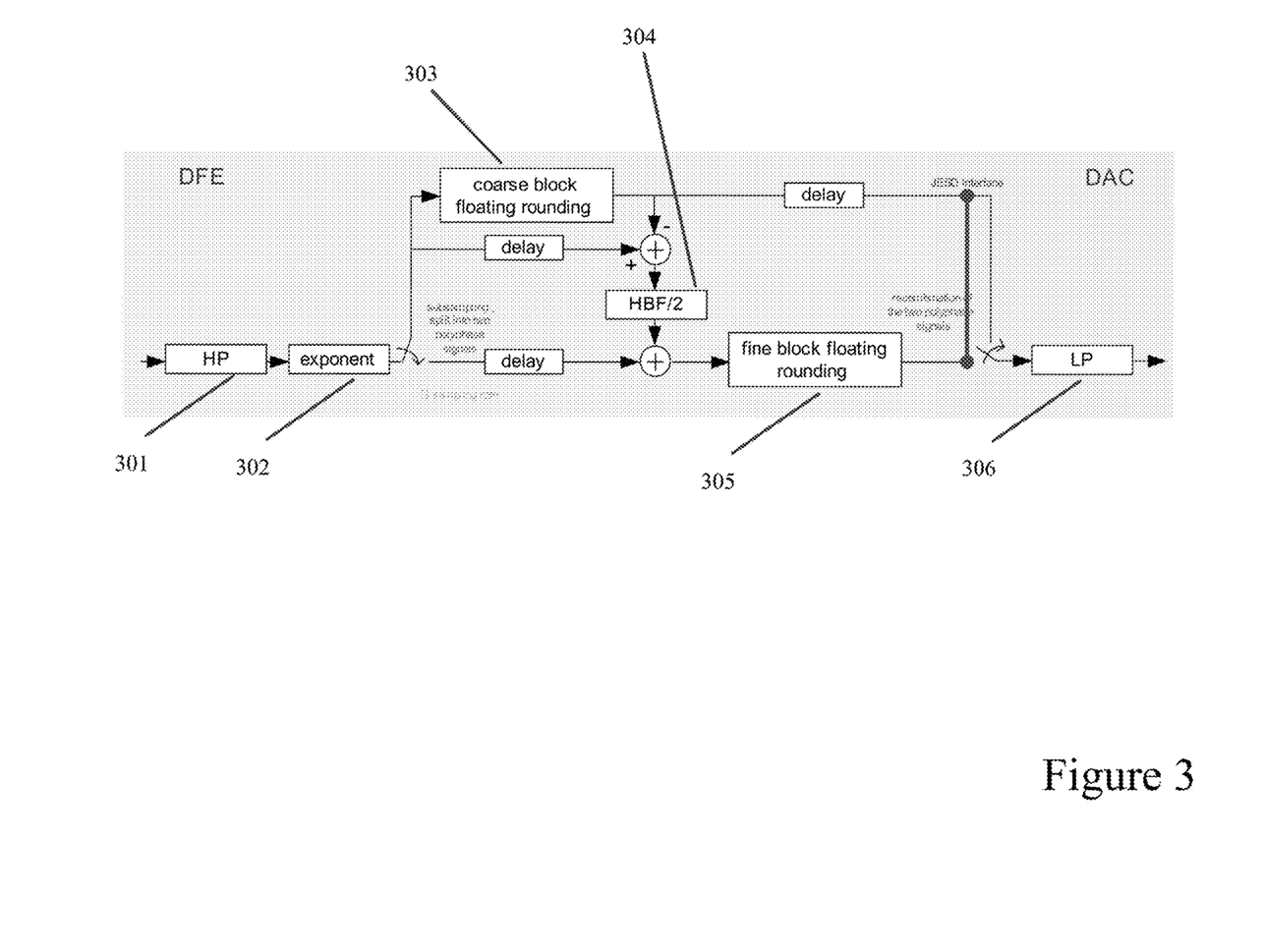
FIG. 3 illustrates a digital front end and different transceiver modes according to certain embodiments.

The signal may be compressed at DFE 101 or at converter 102 using a block floating point format, as illustrated in FIG. 3. A floating point format may include two parts, a mantissa and an exponent. In a traditional floating point format, each sample may include its own mantissa and exponent. In a block floating point format, however, a block of samples may each have their own mantissa, but may share a common exponent. This common exponent may be applied to in-phase and quadrature components of the signal, in an embodiment in which a complex signal is to be transmitted. Compression of the data may occur in DFE 101 or converter 102, while decompression may occur in converter 102 or DFE 101, respectively. The block floating point format may therefore be used to reduce the data rates of the signal at the JESD interface. In some embodiments, no modification to the JESD interface is necessitated by use of the block floating point format.

Certain embodiments, may utilize control registers instead of low voltage differential signaling (LVDS) control interface lines. As can be seen in FIG. 1, converter 102 includes control registers in which various transmissions 105 and/or receptions 107, are enabled. In addition, in some embodiments, the signal may be used for determining the functioning or state of at least one general purpose input or output (GPIO) pin. GPIO functioning of the converter, for example, may be to control the power amplifier of a signal. GPIO state may determine whether the GPIO pin serves as an output or an input. FIG. 1 also includes a feedback (FB) signal 106, which may be received by the converter.

FIG. 2 illustrates an example of a digital front end according to certain embodiments. In particular, FIG. 2 illustrates a DFE 201 and a converter 202. A signal may be transmitted from DFE 201 to converter 202, in certain embodiments, through interface JESD 204B/C 203 and/or SPI 204. As can be seen in FIG. 2, converter 202 includes a JESD block 205 used to receive a signal from JESD interface 203, and a decompression block 206 used to decompress the compressed data received from DFE 201. The compressed data is compressed via a block floating point format at DFE 201, and converter 202 may have a dedicated decompression internet protocol (IP) entity 206 located within converter 202 that may be dedicated to decoding or decompressing the received compressed signal. In other embodiments, JESD block 205 and/or decompression block 206 may be located at DFE 201, rather than converter 202.

FIG. 3 illustrates an example of a digital front end according to certain embodiments. In particular, FIG. 3 illustrates a method by which the DFE goes about compressing data in a signal in a block floating point format. The compressed data may help to reduce the bit rate of the signal transmitted through the JESD interface, for example. Because the power consumption at the JESD interface may depend on the bit rate, lowering the bit rate can also help to reduce the power consumption at the JESD interface. Certain embodiments can utilize a block point floating format to reduce the bit rate of the signal, without appreciable degradation of the dynamic range of the signal.

In certain embodiments, due to the DPD in the transmission, the bandwidth of the transmitted signal may be higher than the reception bandwidth of the signal. For example, the transmission bandwidth may be greater than the reception bandwidth by at least a factor of 2.5. The frequency regions of the transmission signal may be of a high magnitude than intermodulation frequency regions. For example, the frequency of the transmission signal may be 25 or more decibels (dB) greater than the intermodulation frequency regions. In some embodiments, after pre-distortion, a reduction of the intermodulation frequency regions of up to 55-60 dB, for example, may be performed to meet 5G performance requirements.

Figure 7:
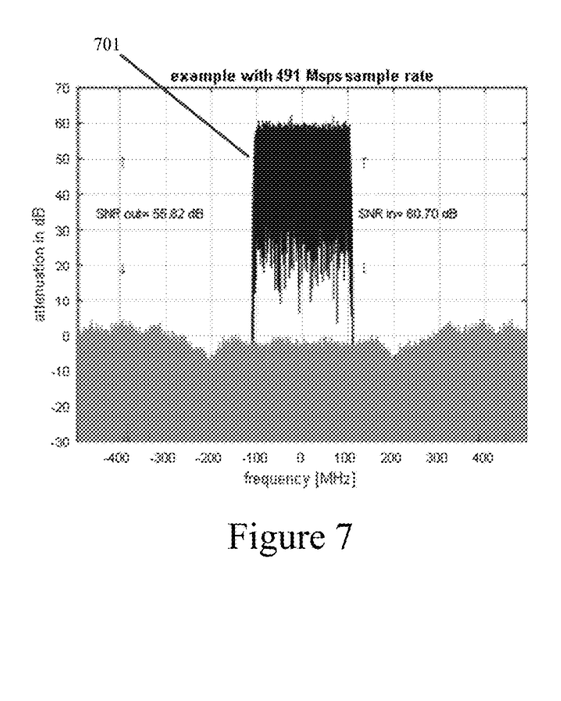
FIG. 7 illustrates a chart according to certain embodiments.

As can be seen in FIG. 3, an incoming signal may be filtered through a high pass (HP) filter 301. The HP filter may increase the magnitude of the out-of-band intermodulation frequencies so that the intermodulation frequencies may be at the same level, or a bit smaller, than the carrier signals. A low pass (LP) filter 306 may then be used to compensate for HP filter 301 after the fine signal and the coarse signal have been transmitted and combined. In other words, LP filter 306 is used to counteract the effects of HP filter 301 by lowering the frequency of the transmitted signal after the coarse signal and the fine signal have been transmitted and combined. An example of the spectrum after HP filtering and LP filtering is illustrated in FIG. 7.

As discussed above, in a block floating point format, a plurality of samples N, which may be complex, may share a same or common exponent. N may represent the number of samples having a common or shared exponent. Once the incoming signal is filtered through HP filter 301, a shared or common exponent for a plurality of sample N may be determined. In certain embodiments, N may equal eight, meaning that eight samples are combined to have a common or shared exponent. In other embodiments, any other number of samples may share a common or shared exponent. Once assigned an exponent, the mantissa of the sample may be determined.

To reduce the bit rate of the signal, the single incoming transmitted signal may be split into two separate polyphases of a signal, which are described below as a coarse signal and a fine signal. In certain embodiments, the single incoming signal may be separated by a multiplexer. Each of the separate signals may have half of the sample rate as compared to the single incoming signal. In some embodiments, the incoming signal may be split into three or more polyphases.

The coarse signal, which may be generated based on a first polyphase signal, may undergo a coarse block floating rounding 303, in which the coarse signal is rounded so that the coarse signal samples occupy a lower number of bits of the mantissa of the block floating point format than the fine signal. For example, the coarse signal samples may have a 6 bit in-phase and a 6 bit quadrature. The coarse signal mantissa may therefore have an accuracy of 6 bits. The rounding allows that the coarse signal to be less precise than the fine signal, which may for example have an accuracy of 9 bits. In some embodiments, however, using coarse block floating rounding may introduce a high quantization error.

The coarse signal may be combined with the fine signal in a block floating point format comprising at least a coarse mantissa, a fine mantissa, or a common exponent. The fine signal may be generated by a second or another polyphase. In particular, a correction signal may be calculated by subtracting the quantization error caused by the coarse block floating rounding, defining an error signal due to the calculation, and filtering the error signal by scaling the error signal through a half-band filter (HBF/2) 304. The filtered error signal may then be subtracted from the second polyphase signal. The error may be determined by subtracting the value of the coarse block floating rounding from a coarse signal that has been delayed, which may be similar to the implementation delay of the coarse block floating rounding. This subtraction may therefore allow for determining of the quantization error introduced by the coarse block floating rounding. The determined value of the coarse error may then be put through a polyphase of a half-band filter 304, and subtracted from the fine signal, which may also have been delayed.

The fine signal, the second polyphase of the signal, may determine the in-band noise. The fine signal may undergo a fine block floating rounding 305 so that the fine signal samples occupy a higher number of bits of the mantissa of the block floating point format than the fine signal. For example, the fine signal samples may have a 9 bit in-phase and a 9 bit quadrature, which means that the fine signal mantissa may have an accuracy of 9 bits. The coarse signal, on the other hand, may have an accuracy that is lower than that of the fine signal.

In some embodiments, the fine signal and the coarse signal may then be transmitted from the DFE to a digital-to-analog converter. The fine signal, with the removed coarse error, may be combined with the previously rounded coarse signal in a block floating point format. Certain embodiments may allow for the fine signal and the coarse signal to be combined as altering samples in a mantissa of the block floating point format. In other words, the odd samples of the mantissa may include the coarse signal, while the even numbers include the fine signal. As such, each two consecutive samples may alternate between a fine signal and a coarse signal. For example, the fine signal may occupy the even samples, and the coarse signal may occupy the odd samples. FIG. 3, therefore, illustrates that the coarse signal and the fine signal are combined in a block floating point format including altering samples of the coarse signal and the final signal in a mantissa of the block floating point format.

As discussed above, in certain embodiments, after the HP filtering of the single signal, a shared or common exponent for a block of N samples can be determined. In-phase part, also known as real part, and quadrature part, also known as imaginary part, of the samples may be considered together. $x(i) = [1\ 1\ 1\ 0\ 1\ \ldots]$ may be a representation of the real part of a sample $x_{real}(i)$ of a coarse signal. The real sample may be represented according to the following:

$$shift_{real,i} = \begin{cases} 0, & x_{real}(i) = [0\ 1\ \ldots] \text{ or } x_{real}(i) = [1\ 1\ \ldots] \\ -1, & x_{real}(i) = [0\ 0\ 1\ \ldots] \text{ or } x_{real}(i) = [1\ 0\ 1\ \ldots] \\ -2, & x_{real}(i) = [0\ 0\ 0\ 1\ \ldots] \text{ or } x_{real}(i) = [1\ 0\ 0\ 1\ \ldots] \\ -3, & x_{real}(i) = [0\ 0\ 0\ 0\ 1\ \ldots] \text{ or } x_{real}(i) = [1\ 0\ 0\ 0\ 1\ \ldots] \\ \ldots \\ -e, & x_{real}(i) = [0\ 0\ \ldots\ 0\ 1\ \ldots] \text{ or } x_{real}(i) = [1\ 0\ \ldots\ 0\ 1\ \ldots] \end{cases}$$

The first bit of each sample may be the sign bit, and e may be the maximum value considered by the exponent. The imaginary sample may be represented according to the following:

$$shift_{imag,i} = \begin{cases} 0, & x_{imag}(i) = [0\ 1\ \ldots] \text{ or } x_{imag}(i) = [1\ 0\ \ldots] \\ -1, & x_{imag}(i) = [0\ 0\ 1\ \ldots] \text{ or } x_{imag}(i) = [1\ 0\ 1\ \ldots] \\ -2, & x_{imag}(i) = [0\ 0\ 0\ 1\ \ldots] \text{ or } x_{imag}(i) = [1\ 0\ 0\ 1\ \ldots] \\ -3, & x_{imag}(i) = [0\ 0\ 0\ 0\ 1\ \ldots] \text{ or } x_{imag}(i) = [1\ 0\ 0\ 0\ 1\ \ldots] \\ \ldots \\ -e, & x_{imag}(i) = [0\ 0\ \ldots\ 0\ 1\ \ldots] \text{ or } x_{imag}(i) = [1\ 0\ \ldots\ 0\ 1\ \ldots] \end{cases}$$

The minimum shift value of a block having N number of samples may be used as the exponent of the block. In other words, the minimum values of $shift_{real,i}$ and $shift_{imag,i}$ shall be used as the common or shared exponent for the coarse signal and/or the fine signal.

As illustrated in FIG. 3, the coarse signal undergoes a coarse block floating rounding. After floating and rounding, the mantissa of the coarse signal may be limited to a range which may be described with $m_c$ bits. $m_e$ may represent the number of bits for the mantissa of the coarse block floating rounding, while $m_o$ may represent the number of bits for the mantissa of the fine block floating rounding, and w represents the number of bits of the exponent field. In addition, $e = 2^w - 1$ may represent the maximum shift due to the exponent, $m_c = m_e - 1$ may represent the number of bits for the magnitude of the coarse mantissa, while $m_f = m_o - 1$ may represent the number of bits for the magnitude of the fine mantissa, except for the sign bit.

The number of bits for the magnitude of the coarse mantissa, also known as the coarse block rounding, may be represented as follows:

$$x_{c,mantissa,real}(2:2:N) = \begin{cases} 1 - 2^{-m_c}, & round(x_{real}(2:2:N) * 2^{(-shift_{min}+m_c)})/2^{(-shift_{min}+m_c)} > 1 - 2^{-m_c} \\ & round(x_{real}(2:2:N) * 2^{(-shift_{min}+m_c)})/2^{(-shift_{min}+m_c)} \\ -1, & round(x_{real}(2:2:N) * 2^{(-shift_{min}+m_c)})/2^{(-shift_{min}+m_c)} < -1 \end{cases}$$

$$x_{c,mantissa,imag}(2:2:N) = \begin{cases} 1 - 2^{-m_c}, & round(x_{imag}(2:2:N) * 2^{(-shift_{min}+m_c)})/2^{(-shift_{min}+m_c)} > 1 - 2^{-m_c} \\ & round(x_{imag}(2:2:N) * 2^{(-shift_{min}+m_c)})/2^{(-shift_{min}+m_c)} \\ -1, & round(x_{imag}(2:2:N) * 2^{(-shift_{min}+m_c)})/2^{(-shift_{min}+m_c)} < -1 \end{cases}$$

$$x_c(2:2:N) = x_{c,mantissa,real}(2:2:N) + j \cdot x_{c,mantissa,imag}(2:2:N)$$

The determined samples of the coarse mantissa may then be combined with the fine mantissa in a manner in which the mantissa of the coarse signal and the mantissa of the fine signal alternate in two successive or consecutive samples. Once the magnitude of the coarse mantissa is determined, the error of the rounded coarse signal may be determined in accordance with the following equation: $x_{err}=x_c(2:2:N)-x(2:2:N)$, where $x_c$ represents the magnitude of the rounded coarse signal, and $x_{err}$ represents the quantized error of the signal. The quantized error of the signal may then be subtracted from the fine signal after the quantized error of the signal has been filtered through a half band filter (HBF). $x_{err,HBF}(1:2:N)$ may represent the quantized error after HBF filtering, and the error may be subtracted from the fine signal as follows:

$$x_e(1:2:end)=x_c(1:2:end)-2*x_{err,HBF}(1:2:end).$$

In certain embodiments, the fine signal may utilize a fine block floating rounding. After the floating and rounding, the mantissa of the fine signal may be limited to the range which can be described with $m_e$ bits. The bits may be represented as follows:

$$x_{f,mantissa,real}(1:2:N) = \begin{cases} 1-2^{-m_f}, & \text{round}(x_{e,real}(1:2:N)*2^{(-shift_{mins}+m_c)})/2^{(-shift_{mins}+mc)} > 1-2^{-m_f} \\ \text{round}(x_{e,real}(1:2:N)*2^{(-shift_{mins}+m_c)})/2^{(-shift_{mins}+mc)} \\ -1, & \text{round}(x_{e,real}(1:2:N)*2^{(-shift_{mins}+m_c)})/2^{(-shift_{mins}+mc)} < -1 \end{cases}$$

$$x_{f,mantissa,real}(1:2:N) = \begin{cases} 1-2^{-m_f}, & \text{round}(x_{e,real}(1:2:N)*2^{(-shift_{mins}+m_c)})/2^{(-shift_{mins}+mc)} > 1-2^{-m_f} \\ \dfrac{\text{round}(x_{e,real}(1:2:N)*2^{(-shift_{mins}+m_c)})}{2^{(-shift_{mins}+mc)}} \\ -1, & \text{round}(x_{e,real}(1:2:N)*2^{(-shift_{mins}+m_c)})/2^{(-shift_{mins}+mc)} < -1 \end{cases}$$

$$x_f(1:2:N) = x_{f,mantissa,real}(1:2:N) + j \cdot x_{f,mantissa,imag}(1:2:N)$$

Figure 4:
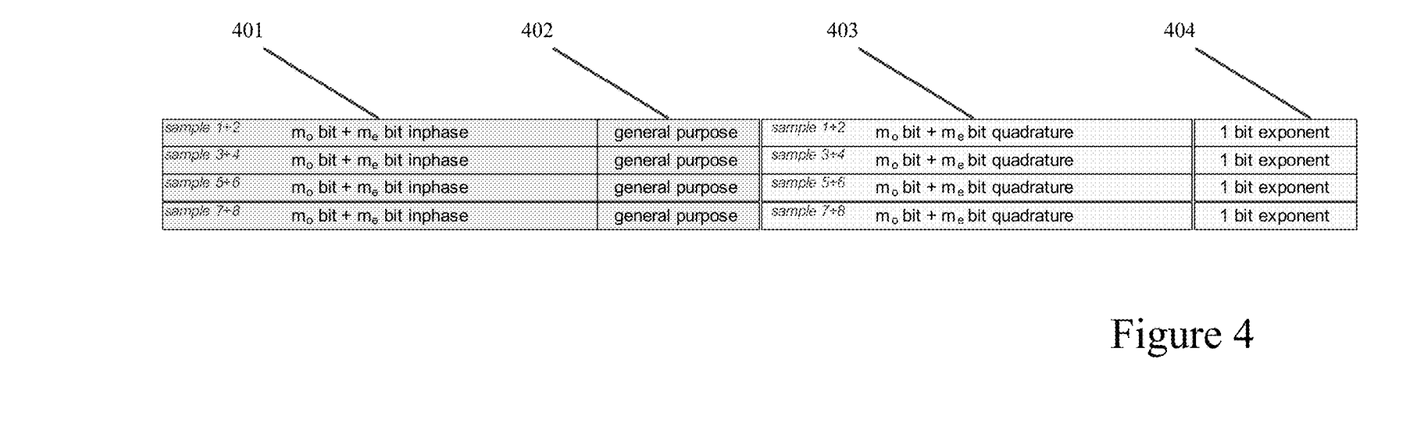
FIG. 4 illustrates a table according to certain embodiments.

The determined samples of the coarse mantissa may then be combined with the fine mantissa in a manner in which the mantissa of the coarse signal and the mantissa of the fine signal alternate in two successive or consecutive samples. FIG. 4 illustrates an example of a table according to certain embodiments. In particular, FIG. 4 illustrates a block point floating format in which the coarse signal and the fine signal are combined. In particular, FIG. 4 represents eight complex samples with control information combined in a single data container. The container shown in the example of FIG. 4 may include four distinct columns.

First column 401 may include the bits for both, the mantissa of the coarse inphase block signal output and the fine inphase block signal output, while second column 402 may include bits having general purpose control information. Third column 403 may include the bits for the mantissa of both, the coarse quadrature block signal output and the fine quadrature block signal output, while fourth column 404 may include the bit exponent, which may be valid for all samples located in first column 401, second column 402, and/or third column 403. As can be seen in the embodiments of FIG. 4, the total number of bits in a container may be any multiple of 8, such as 8, 16, 24, or 32. In other embodiments, any other number of bits may be provided in the container. The bits of the container may be transmitted one row after the other, beginning with the first bit of the first row and first column.

Figure 5:
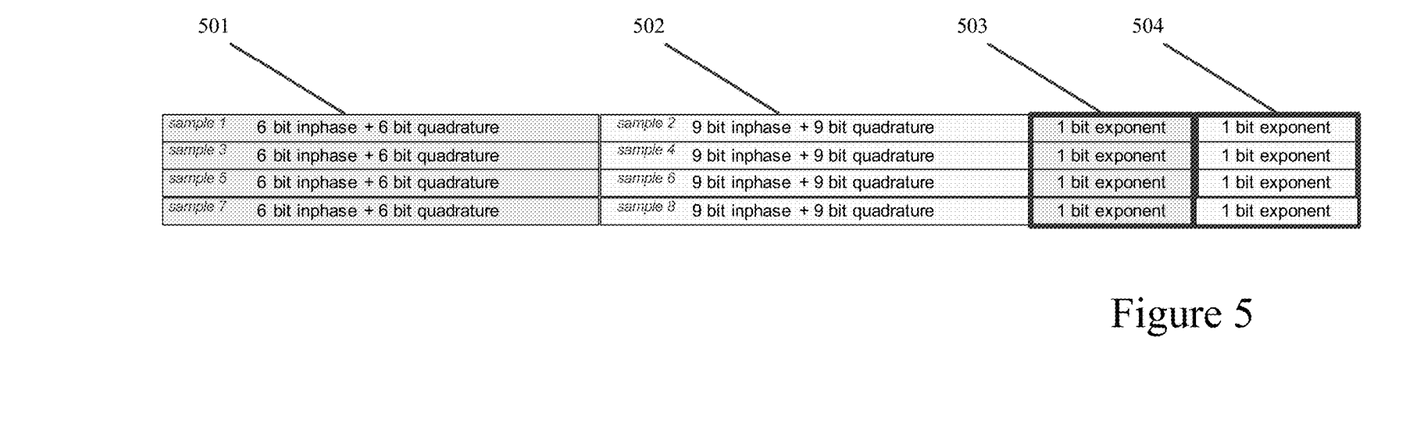
FIG. 5 illustrates an alternative table according to certain embodiments.

FIG. 5 illustrates an alternative example of a table according to certain embodiments. In particular, FIG. 5 illustrates an example of a block floating point format similar as shown in FIG. 4. First column 501 may include odd samples, while second column 502 may include even samples. The odd samples in first column 501 may include the coarse signal mantissa bits, while the even samples in second column 502 may include the fine signal mantissa bits. Third column 503 and fourth column 504 represent a common or shared exponent that may be valid for all samples in both first column 501 and second column 502, respectively. In other embodiments, either one of third column 503 or fourth column 504 may be eliminated, and a single column may be used for the common or shared exponent of both the coarse signal and the fine signal, as shown in FIG. 4. The embodiment shown in FIG. 5 includes a 16 bit container, in which 6 bits are reserved for the coarse signal, 9 bits are reserved for the fine signal, and 1 bit is reserved for the common or shared exponent. Other embodiments may include any other number of bits.

The coarse signal and the fine signal may therefore alternate samples in the block floating point format between odd and even samples. Alternating coarse signal and fine signal samples in two consecutive or successive samples may allow the embodiments to exceed the dynamic range provided for by a 16-bit fixed point format. Certain embodiments may also have a higher in-band accuracy. In some embodiments, the use of the block floating point format shown in FIGS. 3, 4, and 5 may help to reduce the bit rate by around 50%.

In certain embodiments, multiple containers can be combined in a multiframe structure. For example, if four containers are combined, up to sixteen general-purpose bits may be available per frame or per transmission signal. Eight of the general-purpose bits may be used for control registers, as shown in FIG. 2. For example, six of the bits may be used to control six signals, while unused bits may remain available for other uses or functions. While control registers are generally used in a JESD interface, in an SPI interface LVDS interface lines may be used.

In other embodiments, up to sixteen general-purpose bits may be available per frame or per transmission signal. Eight of the general-purpose bits can be used to set the state of the GPIO bits on the pins of the converter. The state may be either a zero or a one, depending on whether the pin is determined to be an output or an input. In certain other embodiments, additional bits may be transmitted over the JESD interface when a full symbol rate may be utilized.

Figure 6:
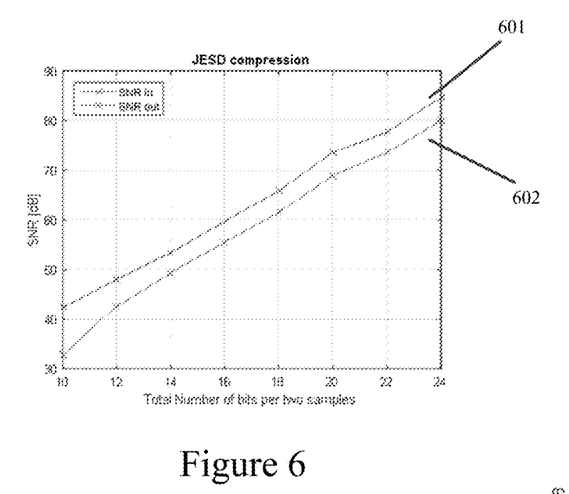
FIG. 6 illustrates a chart according to certain embodiments.

FIG. 6 illustrates a chart according to certain embodiments. In particular, FIG. 6 illustrates a signal to noise ratio (SNR) as a function of the total bits per two samples. As shown in the chart of FIG. 6, by alternating successive samples between the mantissa of the coarse signal and the fine signal, the SNR of the in-band signal may be chosen to be about 5 dB lower than the SNR of the out-of-band signal. Line 601 illustrates the SNR of the in-band signal, while line 602 illustrates the SNR of the out-of-band-band signal outputted from the digital front end shown in FIG. 3. In other words, the above embodiments shown in FIGS. 3, 4, and 5 can help to keep the in-band SNR of a signal by about 5 dB lower compared to the out-of-band noise, and a block floating point format can help to assure a wide dynamic range.

FIG. 7 illustrates a chart according to certain embodiments. In particular, FIG. 7 illustrates an example of 491 measures samples per second (Msps) that utilize the embodiments discussed in FIGS. 3, 4, and 5. As can be seen in FIG. 7, the average SNR of the in-band signal after being compressed in accordance with the above embodiments may be 60.70 dB, while the SNR of the out-of-band signal after being compressed processed in accordance with the above embodiments may be 55.82 dB. The measured dB of signal 701 in FIG. 7 is shown as having a large increase after being passed through the HP filter, and then lowered thereafter when the signal passed though the LP filter.

Figure 8:
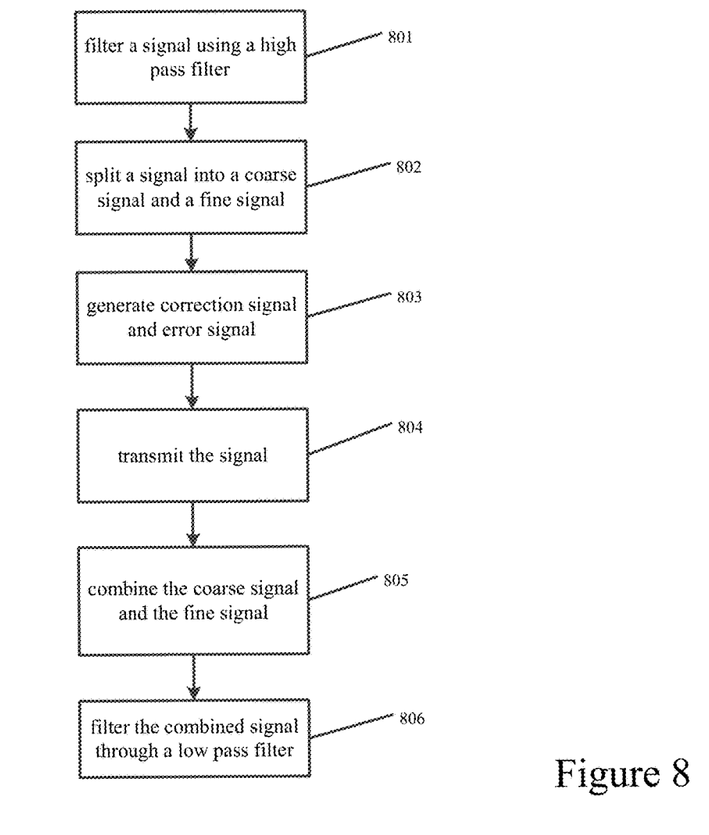
FIG. 8 illustrates a flow diagram of a method according to certain embodiments.

FIG. 8 illustrates a flow diagram of a method according to certain embodiments. In particular, FIG. 8 may illustrate a method according to a digital front end device or a converter. In step 801, a single incoming signal may be filtered through a HP filter. In step 802, the incoming signal may be separated at the DFE or at the converter into two signals, a coarse signal and a fine signal. The coarse signal may be generated based on a polyphase of a signal. A quantized polyphase is used for the transmitting, meaning that a rounded coarse signal will be transmitted. Another polyphase may be used to generate a fine signal.

In certain embodiments, in step 803 a correction signal and an error signal may be generated. a correction signal may be generated for the fine signal based on at least the fine signal, the coarse signal, or a quantized coarse signal. The correction signal reduces in-band noise. Specifically, the correction signal is calculated by subtracting the coarse signal from a quantized coarse signal, where the quantized signal coarse has been rounded or quantized with noise. An error signal may then be defined by the calculated correction signal, and the error signal may be filtered by scaling the error signal with the another polyphase of a half-band filter. The filtered error signal may then be subtracted from the output of the fine signal. The noise error may calculated by subtracting a rounding of the coarse block signal from the coarse block signal.

In other words, a half band filter may include a first polyphase, where only a delay of the signal may be done, and a second or another polyphase with coefficients which are not one or zero. The proposed shaping of the coarse quantization noise may be achieved by the first polyphase of the half band filter being the coarse output signal, which includes an ideal or non-quantized signal, and the coarse quantization error. The second or another polyphase of the half band filter, on the other hand, may include the filtered noise which may be subtracted from the output of the fine signal. Due to at least some of the features of the above embodiments, a high pass filtered coarse noise can be achieved according to the filter coefficients of the half band filter.

In step 804, the fine signal and the coarse signal may be transmitted from the DFE to a converter or from the converter to the DFE. The receiving entity, whether it be the DFE or the converter may then decompress the signal, and use the data derived from the signal to at least control general purpose pins and/or control various registers in a data converter.

In step 805, the coarse signal and the fine signal may be combined in a block floating point format including altering samples of the coarse signal and the final signal in a mantissa of the block floating point format. The coarse signal may occupy the odd samples while the fine signal may occupy the even samples of the block floating point format. In certain embodiments, the coarse signal and the fine signal may be combined in a JESD interface. The fine signal may have a higher number of bits of the mantissa of the block floating point format than the coarse signal. However, the coarse signal and the fine signal may use the same block point floating format exponent. The combining of the fine signal and the coarse signal may occur at the interface between the DFE and the converter.

In step 806, the combined signal including the coarse signal and the fine signal may be filtered through a LP filter.

Figure 8A:
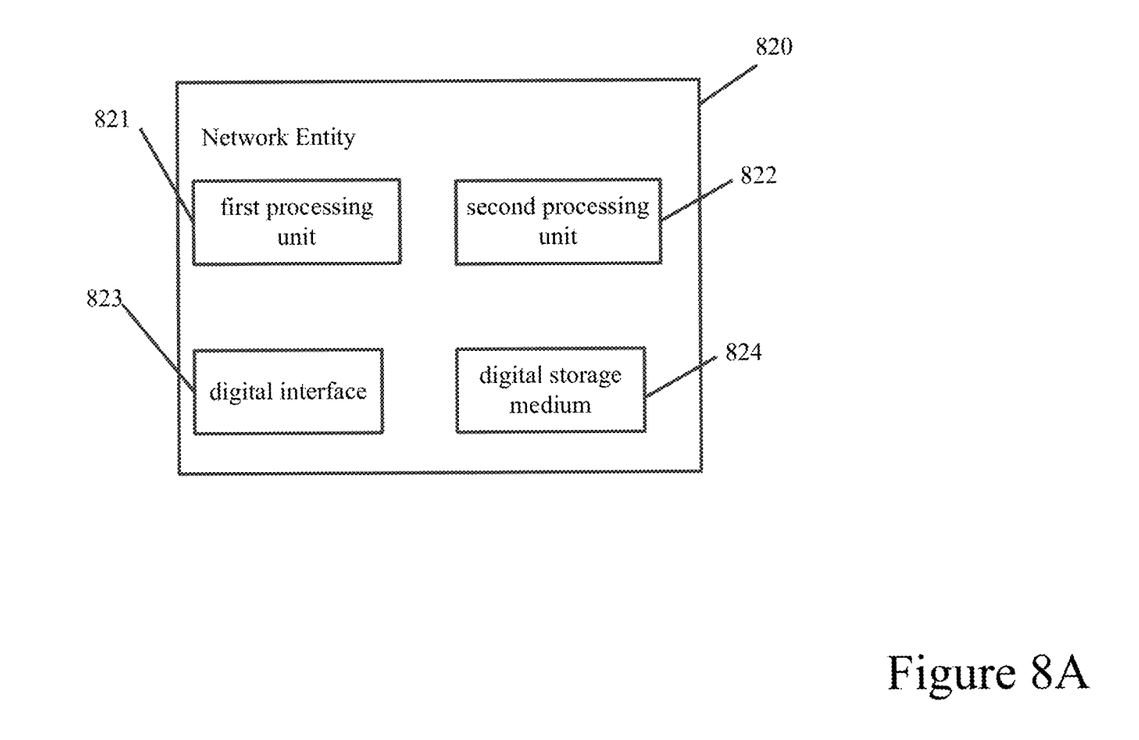
FIG. 8A illustrates a network entity according to certain embodiments.

FIG. 8A illustrates a network entity according to certain embodiments. In particular, network entity 820 may include at least one first processing unit 821, which may be one digital signal processing unit for preparing data transmissions. Network entity 820 may include at least one digital interface 823 and/or a digital storage medium 824. In addition, network entity 820 may include at least one second processing unit, which may be a digital signal processing unit for data reception.

Figure 9:
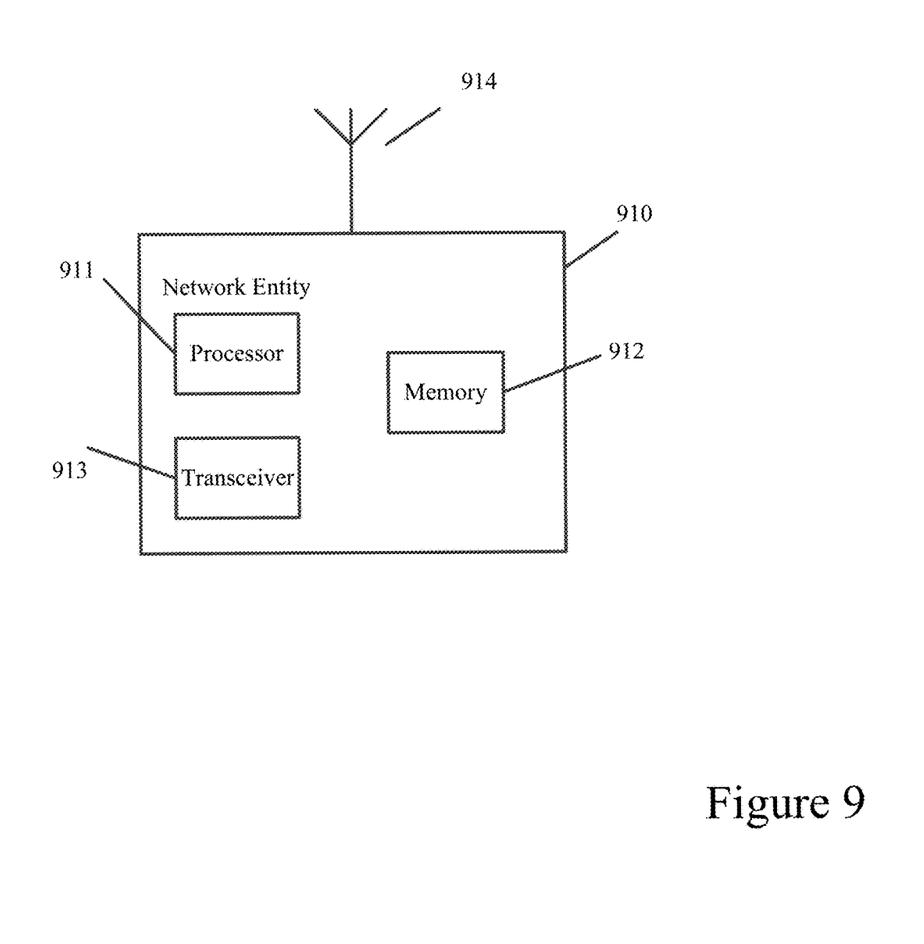
FIG. 9 illustrates a system according to certain embodiments.

FIG. 9 illustrates a system according to certain embodiments. It should be understood that each signals, block, or diagrams in FIGS. 1-8 may be implemented by various means or their combinations, such as hardware, software, firmware, one or more processors and/or circuitry. In one embodiment, a system may include for example, one or more than one network entity 910. The network entity may be a base station, a network node, an access node, an evolved NodeB (eNB), a 5G small cell, an active antenna system, a 5G BTS, a 5G macro, a small cell access point, server, host, or any of the other access or network node discussed herein. Specifically, the network entity may be a transmitter, or a DFE device, a digital-to-analog converter, an analog-to-digital converter, or any other component located inside a radio module of the base station.

Each of these devices may include at least one processor or control unit or module, indicated as 911. At least one memory may also be provided, indicated as 912. The memory may include computer program instructions or computer code contained therein. One or more transceivers 913 may be provided, and the device may also include an antenna, illustrated as 914. Although only one antenna is shown, many antennas and multiple antenna elements may be provided. Other configurations of the device may be provided. For example, network entity 910 may be additionally configured for wired communication, in addition to wireless communication, and in such a case antenna 914 may illustrate any form of communication hardware, without being limited to merely an antenna.

Transceiver 913 may, independently, be a transmitter, a receiver, or both a transmitter and a receiver, or a unit or device that may be configured both for transmission and reception. The transmitter and/or receiver (as far as radio parts are concerned) may also be implemented as a remote radio head which may not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, network entity 910 may transmit the radio signal to a user equipment. A user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a network entity 910, may include means for carrying out embodiments described above in relation to FIGS. 1-8. In certain embodiments, at least one memory including computer program code can be configured to, with the at least one processor, cause the apparatus at least to perform any of the processes described herein.

Processor 911 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. The channel filter used for partial filtering describes above may be implemented using a processor, for example a DSP, FPGA, or an ASIC.

For firmware or software, the implementation may include modules or unit of at least one chip set (for example, procedures, functions, and so on). Memory 912 may independently be any suitable storage device, such as a non-transitory computer-readable medium. A hard disk drive (HDD), random access memory (RAM), flash memory, or other suitable memory may be used. The memory may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may either be fixed or removable.

The memory and the computer program instructions may be configured, with the processor for the particular device, to cause a hardware apparatus such as network entity 910, to perform any of the processes described above (see, for example, FIGS. 1-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 9 illustrates a system including a network entity 910, certain embodiments may be applicable to other configurations, and configurations involving additional elements, as illustrated and discussed herein. For example, multiple network entities and multiple users equipment may be present, or other nodes providing similar functionality, such as nodes that combine the functionality of a user equipment and an network entity, such as a relay node. The network entity 910 may be configured for entity-to-entity communication or for entity-to-user equipment communication.

The above embodiments provide for improvements to the functioning of a network and/or to the functioning of the network entities or computers within the network, or the user equipment communicating with the network. Specifically, certain embodiments allow for power saving due to the use of a block floating point format and/or alternating coarse signal and fine signal samples within the format. Certain embodiment may also utilize a HP filter and/or a LP filter, which may help to further reduce the number of bits used during a signal transmission from the DFE to the converter. Reducing the number of bits may help to reduce power consumption at the JESD interface, for example.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

3GPP third generation partnership project
5G 5th generation
HBF high band filter
dB decibels
HP high pass
LP low pass
oBW occupied bandwidth
FB feedback
TX transmitter
RX receiver DPD digital pre-distortion
JESD joint electron device engineering council standard
DFE digital front end
SPI serial peripheral interface
LVDS low voltage differential signaling
GPIO general purpose input or output

We claim:

1. An apparatus comprising:
   at least one memory comprising computer program code; and
   at least one processor;
   wherein the at least one memory and the computer program code are configured, with the at least one processor, to cause the apparatus at least to:
   separate an incoming signal at a digital front end or a converter into two alternating signals comprising a coarse signal and a fine signal, wherein the coarse signal is generated based on a polyphase of a signal; and
   transmit the coarse signal and the fine signal from the digital front end to the converter or from the converter to the digital front end, wherein a quantized polyphase is used for the transmitting of the coarse signal, and wherein a combination of the coarse signal and the fine signal generates an approximation of the incoming signal.

2. The apparatus according to claim 1, wherein the coarse signal and the fine signal are combined in a block floating point format comprising a common format based at least on a coarse mantissa, a fine mantissa, or a common exponent.

3. The apparatus according to claim 1, wherein another polyphase is used to generate the fine signal.

4. The apparatus according to claim 3, wherein the at least one memory and the computer program code are configured, with the at least one processor, to cause the apparatus at least to:
   generate a correction signal for the fine signal based on at least one of the fine signal, the coarse signal, or a quantized coarse signal, wherein the correction signal reduces in-band noise.

5. The apparatus according to claim 4, wherein the at least one memory and the computer program code are configured, with the at least one processor, to cause the apparatus at least to:
   calculate the correction signal by subtracting the coarse signal from the quantized coarse signal, wherein the coarse signal is non-quantized;
   define an error signal based on the calculating of the correction signal; and
   filter the error signal by scaling the error signal with the another polyphase of a half band filter; and
   subtract the filtered error signal from the fine signal.

6. The apparatus according to claim 5, wherein the coarse block signal is delayed.

7. The apparatus according to claim 1, wherein the at least one memory and the computer program code are configured, with the at least one processor, to cause the apparatus at least to:
   filter the incoming signal through a high pass filter.

8. The apparatus according to claim 1, wherein the at least one memory and the computer program code are configured, with the at least one processor, to cause the apparatus at least to:
   filter the combined coarse signal and fine signal through a low pass filter.

9. The apparatus according to claim 1, wherein the combined signal of the coarse signal and the fine signal is decompressed at the converter or the digital front end.

10. A method comprising:
    separating an incoming signal at a digital front end or a converter into two alternating signals comprising a coarse signal and a fine signal, wherein the coarse signal is generated based on a polyphase of a signal; and
    transmitting the coarse signal and the fine signal from the digital front end to the converter or from the converter to the digital front end, wherein a quantized polyphase is used for the transmitting of the coarse signal, and wherein a combination of the coarse signal and the fine signal generates an approximation of the incoming signal.

11. The method according to claim 10, wherein another polyphase is used to generate the fine signal.

12. The method according to claim 11, further comprising:
    generating a correction signal for the fine signal based on at least one of the fine signal, the coarse signal, and a quantized coarse signal, wherein the correction signal reduces in-band noise.

13. The method according to claim 12, further comprising:
    calculating the correction signal by subtracting the coarse signal from the quantized coarse signal, wherein the coarse signal is non-quantized;
    defining an error signal based on the calculating of the correction signal; and
    filtering the error signal by scaling the error signal with the another polyphase of a half band filter; and
    subtracting the filtered error signal from the fine signal.

14. The method according to claim 10, wherein the coarse signal and the fine signal are combined in an interface between the digital front end and the converter, and wherein the interface is a joint electron device engineering council standard interface.

15. The method according to claim 10, further comprising:
    filtering the incoming signal through a high pass filter.

16. The method according to claim 10, further comprising:
    filtering the combined coarse signal and fine signal through a low pass filter.

17. The method according to claim 10, wherein the combined signal of the coarse signal and the fine signal is decompressed at the converter.

18. A non-transitory computer-readable medium encoding instructions that, when executed in hardware, perform a process, wherein the process comprises at least one of:
    separating an incoming signal at a digital front end or a converter into two alternating signals comprising a coarse signal and a fine signal, wherein the coarse signal is generated based on a polyphase of a signal; and
    transmitting the coarse signal and the fine signal from the digital front end to the converter or from the converter to the digital front end, wherein a quantized polyphase is used for the transmitting of the coarse signal, and wherein a combination of the coarse signal and the fine signal generates an approximation of the incoming signal.

* * * * *